United States Patent
Candy

(10) Patent No.: US 7,579,839 B2
(45) Date of Patent: Aug. 25, 2009

(54) METAL DETECTOR

(75) Inventor: Bruce Halcro Candy, Basket Range (AU)

(73) Assignee: Minelab Electronics Pty Limited, Torrensville (AU)

(*) Notice: Subject to any disclaimer, the term of this patent is extended or adjusted under 35 U.S.C. 154(b) by 239 days.

(21) Appl. No.: 11/576,467

(22) PCT Filed: Nov. 2, 2005

(86) PCT No.: PCT/AU2005/001683

§ 371 (c)(1),
(2), (4) Date: Apr. 1, 2007

(87) PCT Pub. No.: WO2006/047822

PCT Pub. Date: May 11, 2006

(65) Prior Publication Data

US 2008/0094065 A1    Apr. 24, 2008

(30) Foreign Application Priority Data

Nov. 3, 2004    (AU) ............................... 2004906301

(51) Int. Cl.
G01V 3/11    (2006.01)
G01V 3/08    (2006.01)

(52) U.S. Cl. ............... 324/326; 324/228; 324/337
(58) Field of Classification Search ................. 324/228, 324/232–234, 237–240, 327–328, 330–332, 324/334–337, 326
See application file for complete search history.

(56) References Cited

U.S. PATENT DOCUMENTS

| | | |
|---|---|---|
| 4,628,265 A | 12/1986 | Johnson et al. |
| 4,868,504 A | 9/1989 | Johnson |
| 4,948,265 A | 8/1990 | Futerman |
| 5,537,041 A | 7/1996 | Candy |
| 5,576,624 A | 11/1996 | Candy |
| 5,654,638 A | 8/1997 | Shoemaker |

*Primary Examiner*—Bot LeDynh
(74) *Attorney, Agent, or Firm*—Beyer Law Group LLP

(57) ABSTRACT

A real time electronic metal detector including a magnetic transmitter (1) and a receiver (3), wherein the receiver includes approximate sine-wave weighted synchronous demodulation and a switched voltage signal is applied to the magnetic transmitter and the said receiver approximate sine-wave weighted synchronous demodulation is selected to receive synchronously with the switched voltage signal, such that the switched voltage signal and the receiver approximate sine-wave weighted synchronous demodulation may be altered by means of operator selection.

4 Claims, 1 Drawing Sheet

METAL DETECTOR

TECHNICAL FIELD

The current invention relates to a metal detector and has particular application to coin, treasure, prospecting and landmine detectors.

BACKGROUND ART

Some commercially available analogue electronics based single frequency sinusoidal signal transmitting metal detectors have switches which allow a user to select different frequencies. The electronics in such detectors is often expensive. The ability to select different frequencies may be useful, for example, in gold nugget prospecting where the size of gold nuggets may vary from location to location and hence the optimal frequency for detection may also vary.

U.S. Pat. No. 5,537,041 discloses a metal detector which transmits multi-period pulses and operates in the time domain, as too do most, and probably all, commercially available pulse induction metal detectors; for example those disclosed in U.S. Pat. No. 4,868,504 and U.S. Pat. No. 5,576,624. Time domain detectors are relatively highly susceptible to electromagnetic interference owing to wide receive bandwidths.

U.S. Pat. No. 4,628,265 discloses a frequency domain metal detector which applies a voltage square-wave signal to a magnetic transmitter and the received fundamental and third harmonics are band-pass filtered and then synchronously demodulated. With this approach, only two frequencies are detected simultaneously and owing to the narrow receive bandwidths of the band-pass filters, the metal detector will not be highly susceptible to electromagnetic interference.

U.S. Pat. No. 4,942,360 discloses a metal detector which detects more than one frequency simultaneously and operates in the frequency domain. This is useful to reject magnetic soil signals measure and also to characterize targets.

JEEG, volume 2, issue 1, March 1997, p 53-64 "GEM-3: A Monostatic Broadband Electromagnetic Induction Sensor" I J Won et al.

This paper discloses a geological prospecting detector that first takes a series of measurements, then multiplies the collected data by sine and cosine weighting functions for different frequencies. The outputs do not then pass through low pass filters. An output result is obtained in about 1 second, not in real time.

Some commercially available metal detectors use digital signal processing technology to use sine wave weighted synchronously demodulation. At least one of these detectors also applies a square-wave voltage to a magnetic transmitter and also detects the fundamental and third harmonic in the frequency domain as does U.S. Pat. No. 4,628,265 but achieves this by sine-wave weighted synchronously demodulation rather than exploiting the use of band-pass filters.

SUMMARY OF INVENTION

An object of this invention is therefore to provide a metal detector improvement that assists an operator such as a prospector in the location of targets, or at least to provide the public with a useful alternative to the prior art. It is a further object that the improved metal.

There is a need for low cost detectors with low susceptibility to electromagnetic interference with user selectable detection frequencies, including the capability of receiving at more than one frequency simultaneously. It is not essential that the sine and cosine weighting should be highly accurate for practical high rejection of environmental magnetic noise: Total harmonic distortion of the weighting factor of say <10% will cause a practical improvement in magnetically noisy environments.

An object of this invention is therefore to provide a metal detector improvement at relatively low cost that assists an operator such as a prospector in the location of targets.

The current invention alleviates at least some of the problems of the prior art by applying a switched voltage signal to a magnetic transmitter and a receiver including approximate sine-wave weighted synchronous demodulation which receives a magnetic field synchronously with the switched voltage signal. An operator may select the frequency profile of the approximate sine-wave weighted synchronously demodulation, the transmit switched output voltage signal may also be appropriately altered when the user selects different approximately sine-wave weighted synchronously demodulation profiles, which may include frequency change and number of relatively strong frequencies transmitted. The electronics may be low in cost by the employment of digital signal processing and switching circuitry.

In one form of this invention there is provided a real time electronic metal detector including a magnetic transmitter and a receiver,
  wherein the receiver includes approximate sine wave weighted synchronous demodulation,
  and a switched voltage signal is applied to the magnetic transmitter,
  and the said receiver approximate sine wave weighted synchronous demodulation is selected to receive synchronously with the switched voltage signal,
  such that the switched voltage signal and the receiver sine wave weighted synchronous demodulation may be altered by means of operator selection.

The term "real time" in this application is where the time taken for the detector to receive, process, and output the necessary information to the user is not discernable. In a device according to the current invention the output product may be continuously passed through loss pass filters so that the delay is merely the sampling rate of say $\frac{1}{6000}$ of a second. That is not discernable to the user, except for the low-pass filter action and other possible very short digital processing delays.

In preference the invention is further characterised in that the said switched voltage signal waveform may be a square-wave whose fundamental frequency may be altered by an operator and the receiver approximately sine-wave weighted synchronously demodulates at the selected said fundamental frequency.

In preference the invention is further characterised in that the switched voltage signal waveform is multi-period rectangular waveform including at least two different periods between switching transitions of the switched voltage signal, and the receiver selected to approximate sine-wave weighted synchronously demodulate at least at two different frequencies which may be selected by an operator, such that the said two different frequencies correspond to at least two frequencies present in the said switched voltage signal.

If many frequencies are to be received simultaneously with similar signal-to-noise ratios, it is preferred if the said switched voltage signal consists of a multi-period rectangular wave-form whose Fourier transform should be rich in the desired said frequencies. Here multi-period means that within a fundamental repeating waveform, there are at lease two different repeating periods between switching transitions of the switched voltage signal.

In contrast to the method disclosed in I J Won et al, the current invention works in real time, namely no records of data are collected and the data stream is continuously multiplied by approximate sine and cosine functions and the output product of these are continuously passed through low pass filters so that the product output is provided in substantially real time.

BRIEF DESCRIPTION OF THE DRAWINGS

The detailed aspects and exemplification of the invention is made by reference to the drawings wherein.

DETAILED DESCRIPTION OF THE INVENTION

Figure 1:
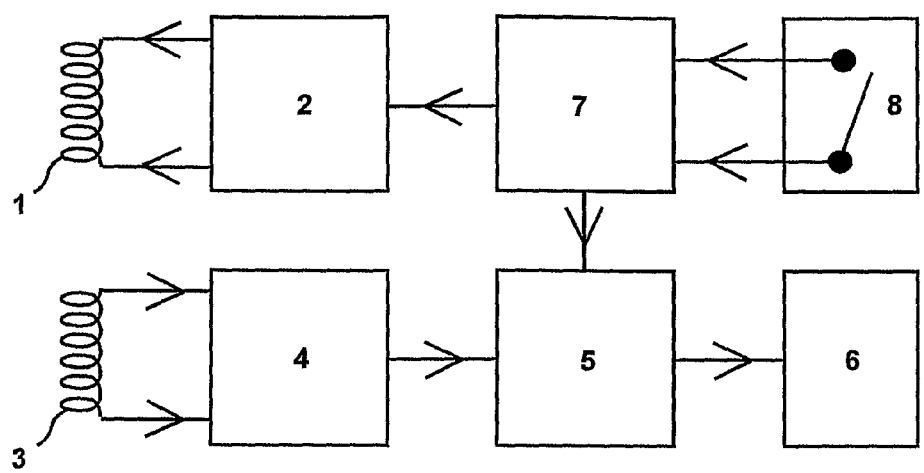
FIG. 1 shows a block electronic circuit diagram of a preferred embodiment.

FIG. 1 shows a switched voltage signal generated by switching electronics 2 is applied to a magnetic transmitter 1, shown here as a transmit coil. Signals from a magnetic receiver 3 are amplified by a preamplifier 4 and applied to applied to approximate sine wave weighted synchronous demodulators 5. The output of these demodulators is fed to further signal processors 6 which provide a useful output signal, such as an audio alert or visual display. Both the transmitter and synchronous demodulators are controlled by a controller 7 which includes a clock to control timing. An operator selects the frequency profile of the approximate sine-wave weighted synchronously demodulation by operating switches 8, which may also alter the switched voltage signal appropriately too.

Figure 2:
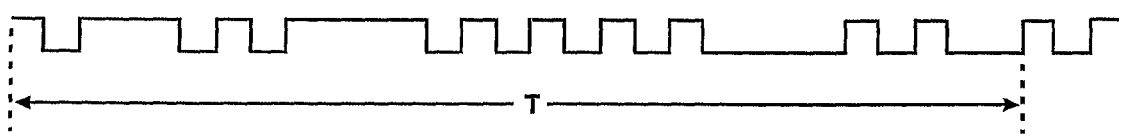
FIG. 2 shows an example of a switched voltage signal consists of a multi-period rectangular wave-form whose Fourier transform is rich at least at 3 frequencies.

FIG. 2 shows a switched voltage signal of fundamental period T, whose waveform repeats, and this is relatively rich in frequencies 1/T, 4/T and 16/T. This waveform and the corresponding receive sine-wave demodulation may very easily be changed using digital signal processing technology, which may be controlled by an operator using for example push-buttons. It would be useful to set 1/T at say 2 kHz if an operator is seeking USA coins, which are relatively conductive, or say 1 kHz if Bronze-age or copper-age daggers which are even more conductive are being sought for example. However, 1/T would be better set to say 16 kHz if small gold nuggets are the targets which exhibit relatively short time constants.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A metal detector used for detecting a metallic target in a soil including:
   a. transmit electronics having a plurality of switches to generate a switched voltage signal, the waveform of the switched voltage signal being one of predetermined repeating multi-period rectangular waveforms;
   b. a transmit coil connected to the transmit electronics to receive the switched voltage signal and to generate a transmitted magnetic field for transmission;
   c. a receive coil to receive a received magnetic field and to provide a received signal induced by the received magnetic field; and
   d. receive electronics connected to the receive coil to process the received signal, the processing including a synchronous demodulation of the received signal using one of predetermined substantially sine-wave weighted synchronous demodulation profiles associated with a corresponding predetermined repeating multi-period rectangular waveform; the profiles being selectable by an operator; and a result of the synchronous demodulation is further processed to provide an indicator output signal in real time, the indicator output signal including a signal indicative of the presence of a metallic target in the soil.

2. A metal detector according to claim 1, wherein:
   a Fourier transform of the switched voltage signal contains frequency components of relatively high magnitude at frequencies corresponding to periods within the predetermined repeating multi-period rectangular waveform and the period of the predetermined repeating multi-period rectangular waveform, as compared to other frequency components across a frequency spectrum of the Fourier transform.

3. A metal detector according to claim 2, wherein:
   the synchronous demodulation of the received signal is such that received signal is synchronously demodulated at frequencies corresponding to periods within the predetermined repeating multi-period rectangular waveform and the period of the predetermined repeating multi-period rectangular waveform.

4. A metal detector according to claim 1, the metal detector further comprising:
   a controller, the controller being accessible to the operator, to control the period of the predetermined repeating multiple-period rectangular waveform.

* * * * *